(12) United States Patent
Chen et al.

(10) Patent No.: US 11,764,566 B2
(45) Date of Patent: Sep. 19, 2023

(54) PROTECTION CIRCUIT

(71) Applicant: Siemens Aktiengesellschaft, Munich (DE)

(72) Inventors: Yiran Chen, Birmingham (GB); Peter Lonsdale, Congleton (GB)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/279,773

(22) PCT Filed: Sep. 23, 2019

(86) PCT No.: PCT/EP2019/075499
§ 371 (c)(1),
(2) Date: Mar. 25, 2021

(87) PCT Pub. No.: WO2020/069894
PCT Pub. Date: Apr. 9, 2020

(65) Prior Publication Data
US 2021/0344188 A1  Nov. 4, 2021

(30) Foreign Application Priority Data

Oct. 2, 2018  (EP) .................................. 18198162

(51) Int. Cl.
*H02H 3/08* (2006.01)
*H02H 3/087* (2006.01)
(Continued)

(52) U.S. Cl.
CPC ............ *H02H 3/087* (2013.01); *H02H 7/125* (2013.01); *H02H 9/026* (2013.01)

(58) Field of Classification Search
CPC ........ H02H 3/087; H02H 7/125; H02H 9/026; H02H 1/043
See application file for complete search history.

(56) References Cited

U.S. PATENT DOCUMENTS 3,935,511 A * 1/1976 Boulanger ............. H02H 9/001
361/111
5,436,824 A 7/1995 Rovner et al.
(Continued)

FOREIGN PATENT DOCUMENTS

| EP | 2400649 A1 | 12/2011 |
|----|-----------|---------|
| EP | 2639949 A1 | 9/2013 |

(Continued)

OTHER PUBLICATIONS

European Search Report for European Application No. 18198162.2-1202 dated Apr. 9, 2019.
(Continued)

*Primary Examiner* — Scott Bauer
(74) *Attorney, Agent, or Firm* — Lempia Summerfield Katz LLC (57) ABSTRACT

A protection circuit including an inrush current detector operable to detect an inrush current from a DC link is disclosed herein. The inrush current detector includes a transistor switch that is turned on in normal operation of the protection circuit. The protection circuit operates to detect when the voltage across the transistor switch exceeds a threshold voltage in response to a detected inrush current, and in response operates to turn off the transistor switch.

16 Claims, 5 Drawing Sheets

(51) Int. Cl.
    *H02H 7/125*    (2006.01)
    *H02H 9/02*     (2006.01)

(56) References Cited

U.S. PATENT DOCUMENTS

| | | | |
|---|---|---|---|
| 2002/0191359 A1* | 12/2002 | Chen | H02H 9/001 |
| | | | 361/58 |
| 2003/0063481 A1* | 4/2003 | Kojori | H02M 1/36 |
| | | | 363/49 |
| 2011/0316489 A1 | 12/2011 | Norimatsu et al. | |
| 2018/0183228 A1 | 6/2018 | Huber | |
| 2020/0028353 A1* | 1/2020 | Leitner | H02H 9/001 |
| 2020/0403493 A1* | 12/2020 | Ljushev | H02P 27/06 |

FOREIGN PATENT DOCUMENTS

| | | |
|---|---|---|
| EP | 2833499 A1 | 2/2015 |
| EP | 3182572 A1 | 6/2017 |
| JP | S63178759 A | 7/1988 |
| JP | 2011125082 A | 6/2011 |

OTHER PUBLICATIONS

International Search Report and the Written Opinion for International Patent Application PCT/EP2019/075499 dated Dec. 11, 2019.

\* cited by examiner

PROTECTION CIRCUIT

The present patent document is a § 371 nationalization of PCT Application Serial No. PCT/EP2019/075499, filed Sep. 23, 2019, designating the United States, which is hereby incorporated by reference, and this patent document also claims the benefit of European Patent Application No. 18198162.2, filed Oct. 2, 2018, which is also hereby incorporated by reference.

TECHNICAL FIELD

The present disclosure relates to protection circuits, in particular, to a protection circuits suitable for preventing damage to DC link capacitors and other components coupled to the DC link of an electrical conversion system.

BACKGROUND

DC link capacitors play an important role in electrical conversion systems that incorporate a DC link between stages. For example, in power electronic systems such as motor drives, a DC link may be provided between an AC grid and an inverter that generates a suitable AC output to drive the motor. The DC link capacitors provide that the voltage on the DC link remains relatively stable as the inverter draws in power to be supplied to the motor. The requirements for low series resistance and high energy storage capacity while operating at a high DC link voltage mean that a series connected pair of DC link capacitors may be used, with half the DC link voltage being applied across each. However, even when using series connected DC link capacitors to share the DC link voltage, it is difficult to design for safe operation of the system in the event of component failure or accidental short circuit of the DC link.

The patent application EP 2 833 499 describes a DC link capacitor protection circuit. In this circuit a resistive divider is connected in parallel with a series connection of DC link capacitors. The mid-points of the DC link capacitors and the resistive divider may have the same voltage, but those voltages will differ in the event of a DC link capacitor fault (such as a short circuit). The DC link capacitor protection circuit includes a diode bridge that provides an output using an optocoupler when the mid-point voltages differ by more than a defined amount. In response to that output from the diode bridge, an input stage for charging the DC link capacitors is deactivated.

This approach requires additional expense in the diode bridge and is not compatible with systems which employ a single DC link capacitor. Furthermore, voltage dips at the input side may lead to a difference in the mid-point voltages, resulting in unwanted tripping of the protection circuit. Hence, an alternative protection circuit suitable for preventing damage to DC link capacitors and associated components in the event of a short circuits or other DC link capacitor failure leading to overvoltage conditions on the DC link is desirable, e.g., also facilitating safe start-up and offering resilience to brownouts.

SUMMARY

According to the present disclosure, there are circuits and methods disclosed herein. The scope of the present disclosure is defined solely by the appended claims and is not affected to any degree by the statements within this summary. The present embodiments may obviate one or more of the drawbacks or limitations in the related art.

Accordingly, there may be provided a protection circuit including an inrush current detector operable to detect an inrush current from a DC link, wherein the inrush current detector includes a transistor switch that is turned on in normal operation of the protection circuit, and wherein the protection circuit operates to detect when the voltage across the transistor switch exceeds a threshold voltage in response to a detected inrush current, and in response operates to turn off the transistor switch.

Thus, in the event of a fault on the DC link such as short circuit of a DC link capacitor, an inrush current may pass directly into the transistor of the protection circuit to enable rapid isolation of supply to the DC link.

In one example, the transistor is provided in series with a DC link capacitor, between a DC link capacitor and a DC negative line, such that the protection circuit operates to detect when the voltage across the transistor switch exceeds a threshold voltage in response to a detected inrush current from the DC link capacitor.

In one example, the transistor switch is provided in series with an input rectifier, between the input rectifier and a DC negative line, such that the protection circuit operates to detect when the voltage across the transistor switch exceeds a threshold voltage in response to a detected inrush current from the DC negative line.

In one example, the inrush current detector includes a gate driver circuit arranged to control the transistor switch. In one example, the inrush current detector includes a transistor switch biased by a gate driver circuit so as to be turned on in normal operation of the protection circuit. In one example, the inrush current detector includes a transistor switch that is biased by a gate driver circuit so as to operate in its saturation region in normal operation of the protection circuit.

In one example, the inrush current detector detects the inrush current and operates the gate driver circuit to turn off the transistor switch in response to the detected inrush current, and thereby isolate the DC link.

In one example, the inrush current detector is arranged to detect an inrush current from the DC link by detecting that the voltage across the transistor switch exceeds a threshold voltage. In one example, the inrush current detector is arranged to detect an inrush current from the DC link by detecting a predetermined threshold voltage across the transistor switch. In one example, the predetermined threshold voltage corresponds to a maximum allowed inrush current at the transistor switch.

In one example, inrush current detector is arranged to detect an inrush current from the DC link by detecting that the voltage across the transistor switch exceeds a threshold voltage, the threshold voltage corresponding to desaturation of the transistor switch.

In one example, the transistor switch includes an insulated-gate bipolar transistor (IGBT). In one example, inrush current detector is arranged to detect an inrush current from the DC link according to the collector-emitter voltage of the transistor switch.

IGBTs are available which demonstrate a relatively sharp transition to saturation behavior even when subjected to high current. Although relatively slower to turn off than other transistor switches, the cost of producing the protection circuit with an IGBT transistor switch may also be relatively lower than for other transistor switches that may be required for a protection circuit rated to a particular voltage.

In one example, the transistor switch includes a FET, such as a MOSFET/SiC MOSFET, or includes a GaN based MOSFET, MESFET, or HEMT device. In one example, inrush current detector is arranged to detect an inrush current from the DC link according to the drain-source voltage of the transistor switch.

MOSFET devices may demonstrate relatively fast turn off times that are desirable for fast detection and DC link fault protection operation, but compared to IGBTs, may have a higher cost per unit area.

In one example, the protection circuit further is further provided with a current limiting resistor connected in parallel to the transistor switch. In one example, the current limiting resistor includes a positive temperature coefficient thermistor.

By providing a current limiting resistor in parallel with the transistor switch, peak current flowing from the DC link capacitor is reduced. Use of a positive temperature coefficient thermistor may provide a resistance which is normally low, but which rapidly rises in the event of an inrush current to the protection circuit while the transistor switch is turned off. This is useful to limit current from the DC link during start-up so that charge may build on the DC link capacitor.

In one example, the protection circuit further includes a fault notification terminal and is arranged to output a fault notification signal to the fault notification terminal after the protection circuit isolates the DC link in response a detected inrush current.

In this way, the protection circuit may be readily integrated with other protection or control circuits, for easier fault notification/diagnostic operations.

In one example, the protection circuit further includes an input-shut down terminal and is arranged to output an input-shut down signal to the input shut-down terminal after the protection circuit isolates the DC link in response a detected inrush current.

In this way the protection circuit may enable powering down of the supply from which the DC link is fed.

Accordingly, there may be provided a power conversion system including a protection circuit as described herein.

In one example, the power conversion system operates between an input supply and a load, for example, between an input supply and a motor drive.

In one example, the protection circuit is provided integral with a motor drive.

In one example, the power conversion system includes an inverter, with the protection circuit arranged to operate prior to initialization of the inverter to provide protection for the DC link on inverter initialization.

Accordingly, there is provided a method of protecting components coupled to a DC link, the method including detecting an inrush current from the DC link in a protection circuit which includes a transistor switch that is turned on in normal operation of the protection circuit, and, in response to the detected inrush current turning off the transistor switch, wherein the detecting act is performed by detecting when the voltage across the transistor switch exceeds a threshold voltage.

In one example, the transistor switch is provided in series with a DC link capacitor, between a DC link capacitor and a DC negative line, such that the protection circuit operates to detect when the voltage across the transistor switch exceeds a threshold voltage in response to a detected inrush current from the DC link capacitor.

In one example, the transistor switch is provided in series with an input rectifier, between the input rectifier and a DC negative line, such that the protection circuit operates to detect when the voltage across the transistor switch exceeds a threshold voltage in response to a detected inrush current from the DC negative line.

In one example, the method includes operating a gate driver circuit to turn off the transistor switch in response to the detected inrush current.

In one example, the method includes detecting desaturation of the transistor switch, according to a collector-emitter voltage of the transistor switch rising above the threshold voltage.

In one example, the method includes passing an inrush current through a current limiting resistor connected in parallel to the transistor switch. In one example, the method includes passing an inrush current through a current limiting resistor connected in parallel to the transistor switch during a start-up operation of the protection circuit. In one example, the method includes passing an inrush current through a current limiting resistor connected in parallel to the transistor switch while the transistor is turned off. In one example, the method includes passing an inrush current through a current limiting resistor in the form of a positive temperature coefficient thermistor connected in parallel to the transistor switch.

In one example, the method further includes powering down the supply from which the DC link is fed.

In one example, the method further includes outputting a fault notification signal. In one example, the method includes outputting a fault notification signal after the protection circuit isolates the DC link in response a detected inrush current.

BRIEF DESCRIPTION OF THE DRAWINGS

Examples of the present disclosure will now be described with reference to the accompanying drawings, in which.

DETAILED DESCRIPTION

Figure 1:
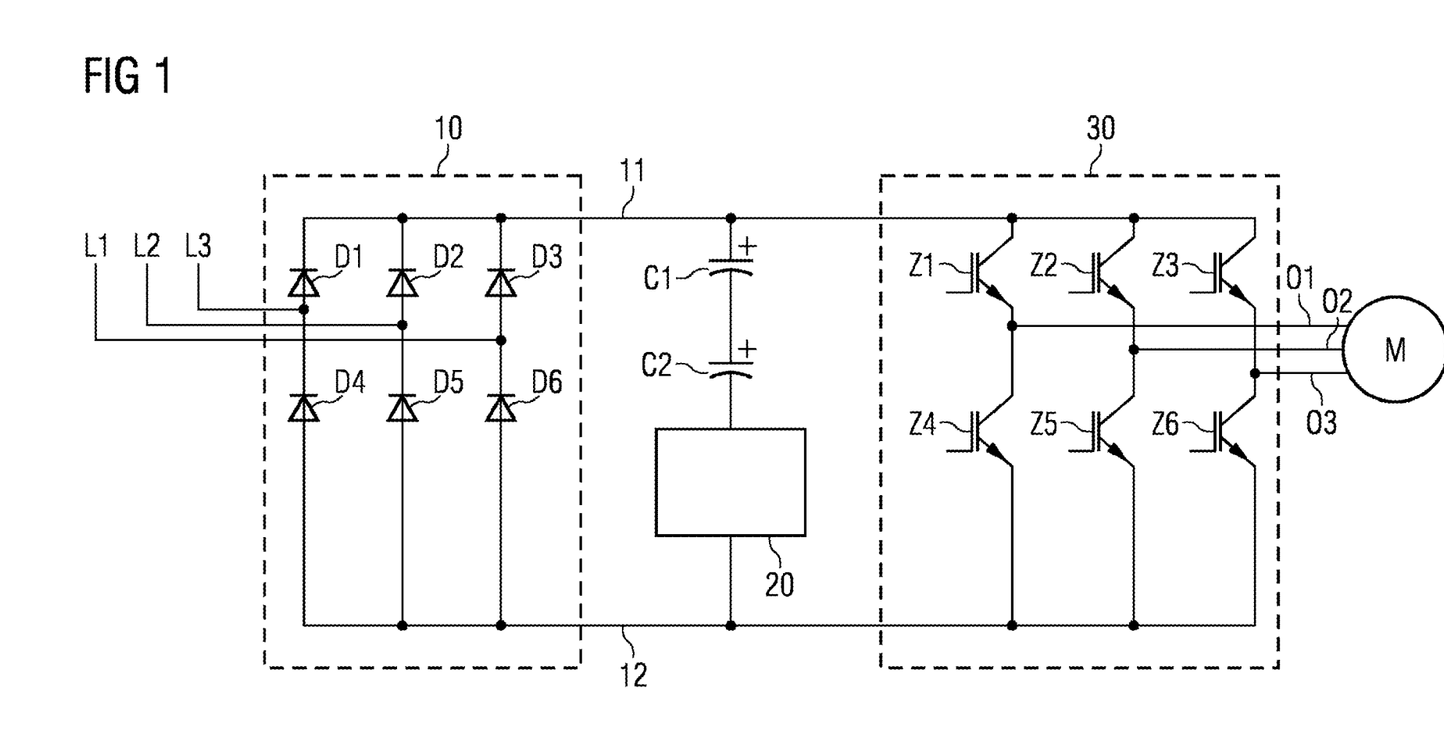
FIG. 1 shows a schematic overview of a power conversion system including a protection circuit according to an example embodiment.

FIG. 1 shows a schematic overview of a power conversion system including a protection circuit 20 according to an example embodiment.

The protection circuit 20 is provided in series with DC link capacitors C1 and C2, connected between a DC positive line 11 and a DC negative line 12. To the left side of the protection circuit 20 are three input lines L1, L2, and L3, which feed diodes D1-D6 arranged as a rectifier 10. To the right side of the protection circuit 20 is an inverter 30 represented schematically by switches Z1-Z6. The inverter 30 operates under the control of a control unit (not shown) to operate as a drive for the motor M, which is coupled to three output lines O1, O2, and O3 from the inverter 30. The connection between the rectifier 10 and the inverter 30, made up of the DC positive line 11 and DC negative line 12, includes the DC link.

The protection circuit 20 includes an inrush current detector and is operable to detect an inrush current from the DC link. In response to detection of an inrush current from the DC link, the protection circuit 20 is arranged to isolate the DC link. This protects the DC link capacitors C1, C2, the switches Z1-Z6 in the inverter 30, and indeed any other electronic components coupled to the DC link from damage by short circuit, component failure of one of the DC link capacitors C1, C2, or similar.

Figure 2:
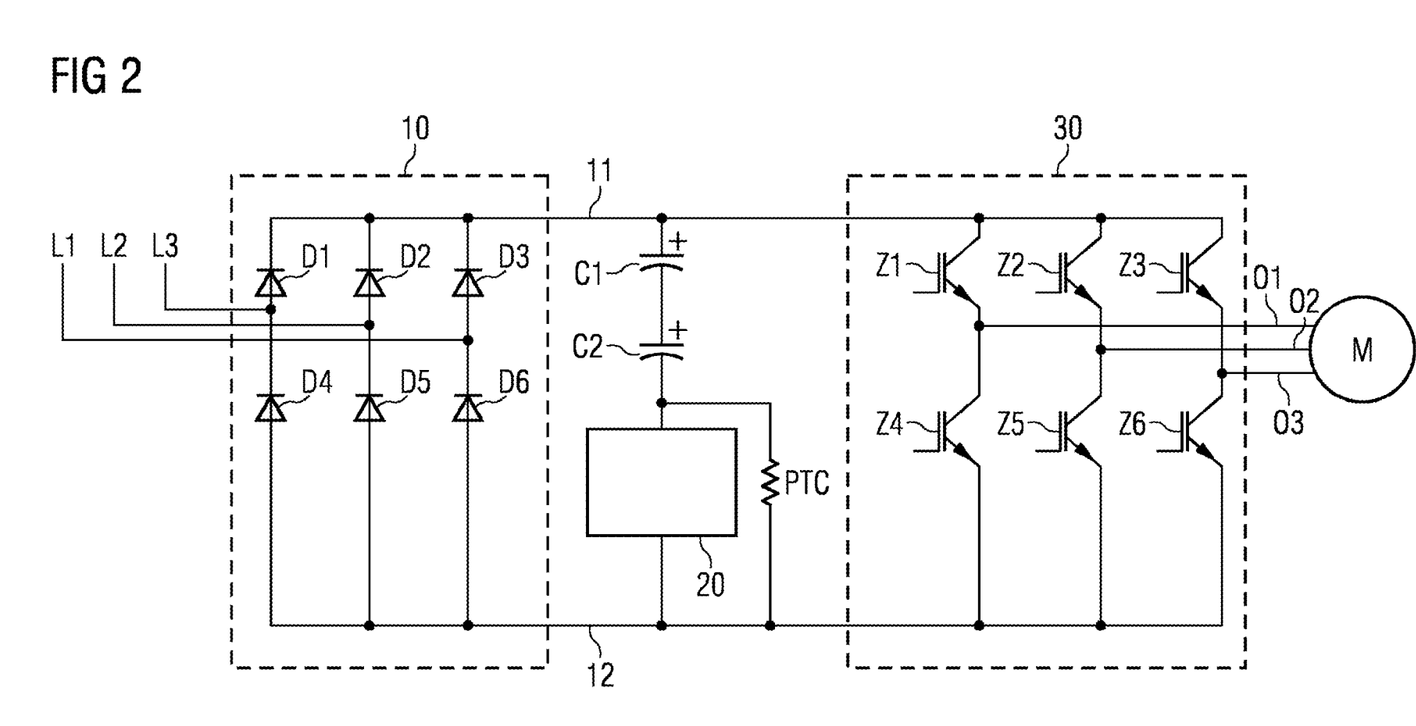
FIG. 2 shows the power conversion system of FIG. 1, and a PTC.

FIG. 2 shows the power conversion system of FIG. 1, along with a positive temperature coefficient thermistor, PTC, connected in parallel therewith.

The PTC is connected in parallel to the transistor switch Q1 of the protection circuit 20 and serves as a current limiter on start-up. The resistance of the current limiting positive temperature coefficient thermistor, PTC, is normally low, but rapidly rises in the event of an inrush current from the DC link at times when the protection circuit 20 isolates the DC link. For example, the current limiting positive temperature coefficient thermistor, PTC, serves to reduce peak current flowing from the DC link capacitor C2 during start-up operation of the protection circuit 20, enabling charge to build up on the DC link capacitors C1, C2. When the DC link voltage stabilizes after start-up, the protection circuit 20 becomes operational ready to isolate the DC link if a fault condition is sensed.

In related art power conversion systems, the operation of a PTC on start-up is enabled by a relay provided in parallel with the PTC. On start-up, the relay is open so that the PTC may operate to control inrush current from the DC link and to allow charge to build up on the DC link capacitors. Thereafter, the relay is closed. By providing the protection circuit 20, start-up operation is facilitated without a separate relay and thus costs of implementing safe start-up and protection are reduced. Elimination of the relay used at start-up has advantages of increased reliability and suitability for use in explosive environments.

Figure 3:
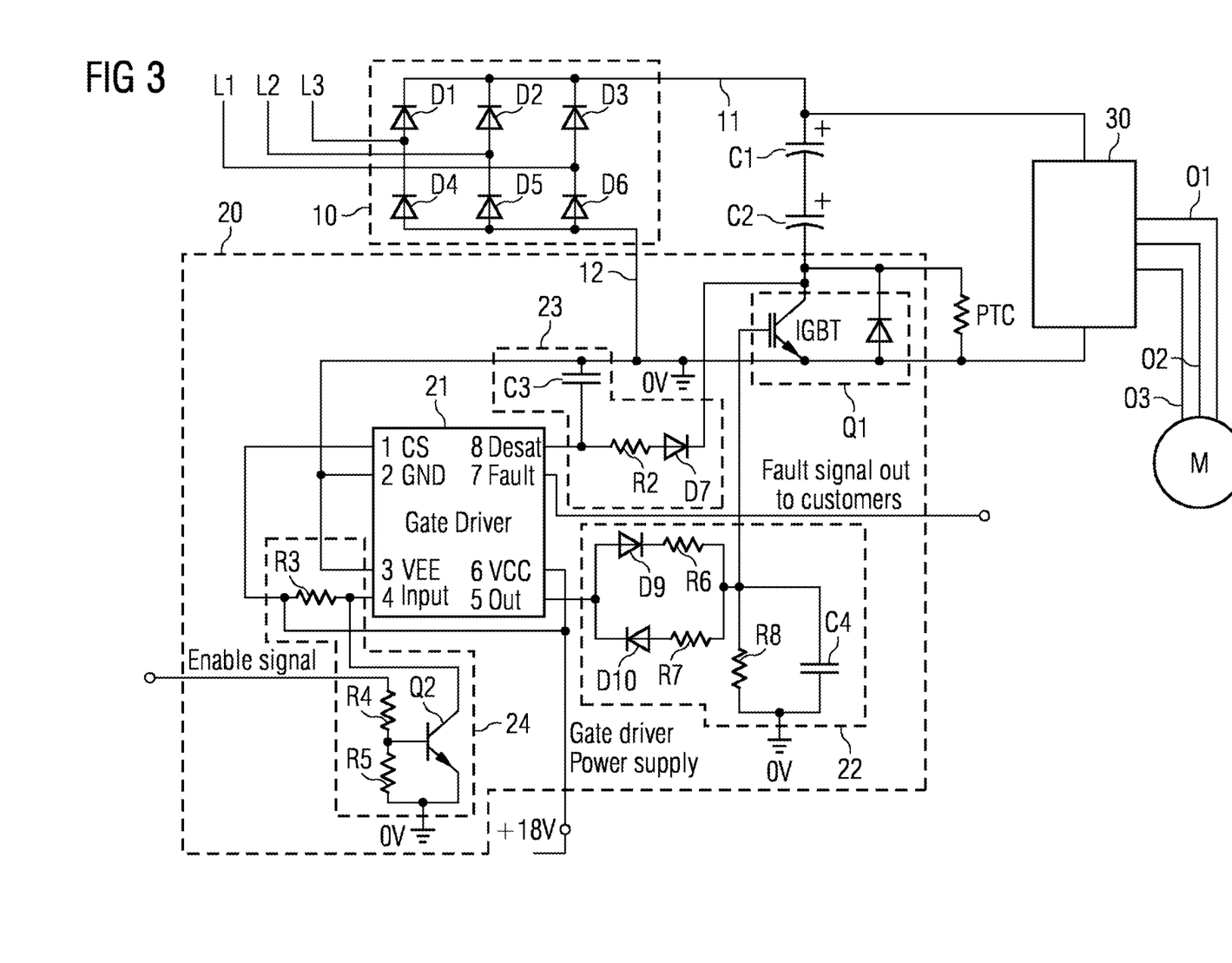
FIG. 3 shows a schematic overview of a power conversion system including a protection circuit, according to an example embodiment, and a PTC.

FIG. 3 shows a power conversion system including a protection circuit 20, according to another example embodiment, along with a positive temperature coefficient thermistor, PTC, connected in parallel therewith.

The inrush current detector includes a transistor switch Q1 and its associated gate driver circuit 21. The transistor switch Q1 is provided as an IGBT with anti-parallel snubber diode, in series with the DC link capacitors C1, C2.

The transistor switch Q1 is connected between the DC link capacitor C2 at its collector and the DC negative line at its emitter. In normal operation of the protection circuit 20, a gate drive voltage is provided to the transistor switch Q1 by gate driver circuit 21 of the protection circuit 20 such that transistor switch Q1 is turned on, operating in its saturation region.

The gate driver circuit 21 is fed, at pin 6, from a +18V supply that is independent of power on DC link. The +18V supply is referenced to 0V and negative supply pins 2 and 3 of the gate driver circuit 21 respectively, these pins being tied to one another. The +18V supply is also fed to pin 1 of the gate driver circuit. The +18V supply is still further fed via an input switching circuit 24 to pin 3 of the gate driver circuit 21, such that provision of an enable signal to the switch-on circuit 24 switches on transistor switch Q2, enabling the operation of the gate driver circuit 21 thereafter.

In normal operation of the protection circuit 20, the gate driver circuit 21 provides the gate drive voltage to the gate of the transistor Q1 from pin 5, through a filter 22.

The transistor switch Q1 is able to detect an inrush current from the DC link because the voltage across the transistor switch Q1 is a function of the current flowing through Q1 from collector to emitter. By detecting a threshold voltage across the transistor switch Q1, it may be inferred that an inrush current is taking place at the transistor switch Q1. In particular, if a short circuit event occurs and the full DC link voltage is applied to the transistor switch Q1, the collector current of Q1 increases to a level that drives the transistor switch Q1 out of the saturated region and into its linear region of operation. This results in a rapid increase in the collector-emitter voltage, which is detected by the gate driver circuit 21 via filter 23. In response, the gate driver circuit 21 rapidly adjusts its output at pin 5 to turn off the transistor switch Q1.

As also described above in relation to FIG. 2, a current limiting positive temperature coefficient thermistor, PTC, is connected in parallel to the transistor switch Q1 of the protection circuit 20. The resistance of the current limiting positive temperature coefficient thermistor, PTC, is normally low, but rapidly rises in the event of an inrush current from the DC link at a time when the transistor switch Q1 is turned off. For example, the current limiting positive temperature coefficient thermistor, PTC, serves to reduce peak current flowing from the DC link capacitor C2 during start-up operation of the protection circuit 20, enabling charge to build up on the DC link capacitors C1, C2. When the DC link voltage stabilizes after start-up, the protection circuit 20 becomes operational with the transistor switch Q1 turned on but ready to be turned off by the gate driver circuit 21 if an inrush current related to a fault condition is sensed.

The gate driver circuit 21 further includes, at pin 7, a fault notification terminal. The gate driver circuit 21 outputs a fault notification signal to the fault notification terminal after the protection circuit isolates the DC link in response a detected inrush current. The fault notification terminal enables the protection circuit 20 to be integrated with other protection or control circuits. This may either be to a human operator, or to enable further automatic safety interventions such as use of a signal at the fault notification terminal to as an input shut-down control to switch off supply to the input lines L1, L2, and L3 after the protection circuit 20 has isolated the DC link in response a detected inrush current.

Figure 4A:
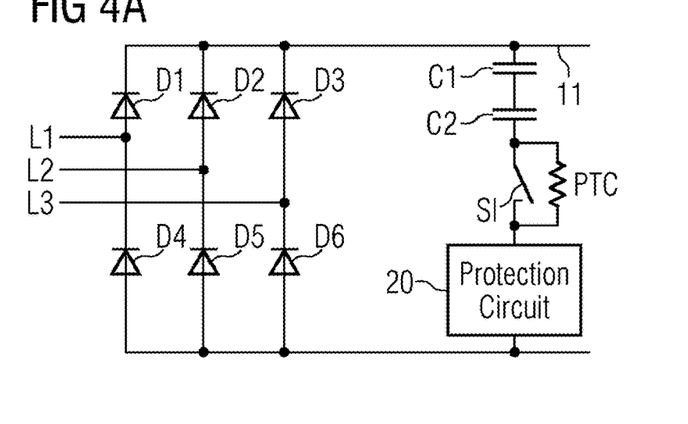
FIGS. 4A-4C each show a schematic overview of a power conversion system including a protection circuit, according to example embodiments, and a PTC, in alternative configurations.

FIG. 4A shows a schematic overview of a power conversion system including a protection circuit according to an example embodiment, in an arrangement similar to FIG. 1. In this example, the protection circuit 20 is provided in series with the DC link capacitors C1, C2, and additionally a relay S1 and parallel PTC provided in order to deal with start-up.

Figure 4B:
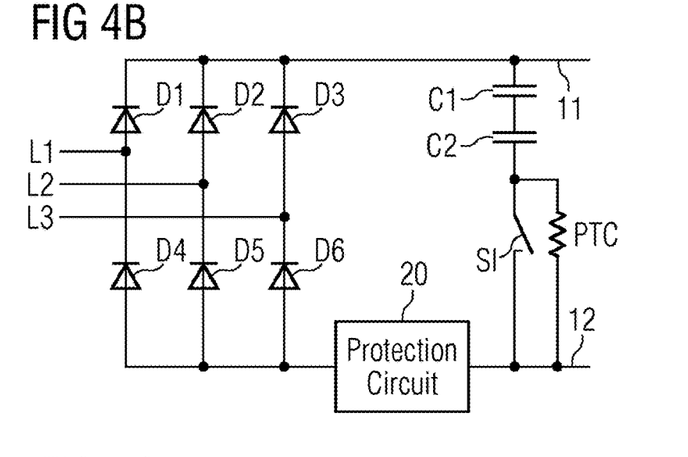

FIG. 4B shows a schematic overview of a power conversion system including a protection circuit according to an example embodiment. A relay S1 and PTC are provided in order to deal with start-up. In this example, the protection circuit 20 is provided in series with the rectifier at the input side of the DC negative line. Providing the protection circuit 20 in this arrangement serves to protect the DC link capacitors C1, C2 and the switching components of the rectifier connected to the output side of power conversion system.

Figure 4C:
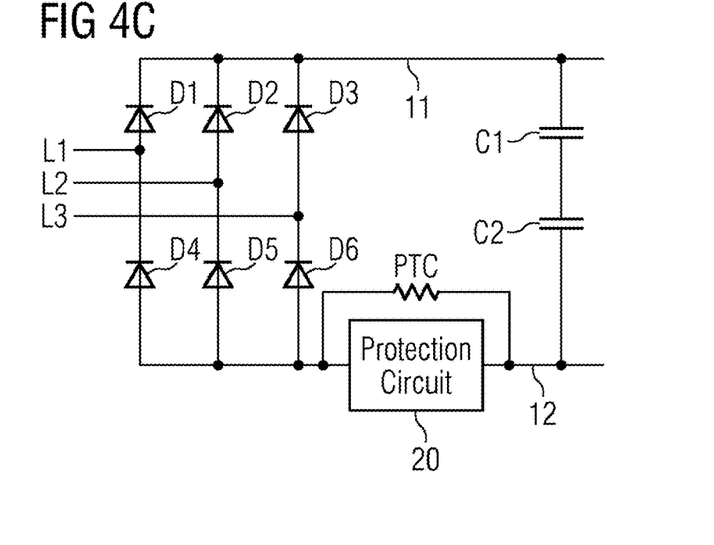

FIG. 4C shows a schematic overview of a power conversion system including a protection circuit according to an example embodiment. In this example, the protection circuit 20 is provided in series with the rectifier at the input side of the DC negative line. Providing the protection circuit 20 in this arrangement serves to protect the DC link capacitors C1, C2 and the switching components of the rectifier connected to the output side of power conversion system. A PTC is provided in parallel with the protection circuit 20, in an arrangement similar to FIG. 2.

Figure 5:
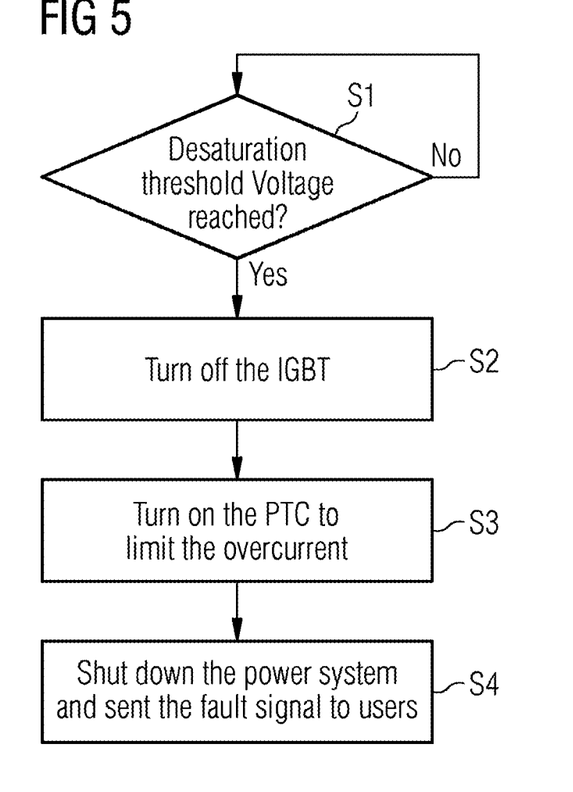
FIG. 5 shows acts in a method of protecting components coupled to a DC link, according to an example embodiment.

FIG. 5 shows acts in a method of protecting components coupled to a DC link, according to an example embodiment. The method may be performed by a protection circuit as set out herein.

The method includes detecting an inrush current from the DC link in a protection circuit connected in series with a DC link capacitor (S1) and isolating the DC link in response to the detected inrush current (S2-S4).

In more detail, the method includes detecting that a desaturation voltage has been reached according to a collector-emitter voltage of the transistor switch rising above a predetermined threshold voltage, S1. In response the transistor switch is turned off, S2. As an optional act, after the detecting and switching off of S1 and S2 take place, any further inrush current is exposed to a positive temperature coefficient thermistor connected in parallel to the transistor switch, S3.

The method may further include one or more additional optional acts of powering down the supply from which the DC link is fed, and sending a fault signal to one or more users, S4.

In addition to being advantageous to prevent general safety issues arising from component failure or accidental short circuit of a DC link, the protection circuit is also useful when incorporated with motor drives. Some safety certification organizations, such as Underwriters Laboratory Inc., may require a motor drive to be able to withstand deliberate short-circuiting of one of paired of DC link capacitors in order to pass their certification. Implementing the protection circuit in a motor drive may reduce costs by eliminating the need for separate testing/certification, enabling safe operation alongside any other protection measures such as circuit breakers/fuses that may be desirable according to particular design or service requirements. As described above, providing a protection circuit that may also facilitate safe switch on behavior, without the need for additional switching components such as a relay, is also advantageous.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract, and drawings), and/or all of the acts of any method or process so disclosed, may be combined in any combination, except combinations where at least some of such features and/or acts are mutually exclusive.

Each feature disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract, and drawings), or to any novel one, or any novel combination, of the acts of any method or process so disclosed.

The invention claimed is:

1. A system comprising:
a protection circuit having an inrush current detector; and
a current limiting resistor,
wherein the inrush current detector comprises a transistor switch that is turned on in normal operation of the protection circuit,
wherein the transistor switch of the inrush current detector is configured to detect an inrush current from a direct current (DC) link because a voltage across the transistor switch is a function of the inrush current flowing through the transistor switch from collector to emitter,
wherein the protection circuit is configured to detect when the voltage across the transistor switch exceeds a threshold voltage in response to the detected inrush current by the transistor switch, and the protection circuit is configured to turn off the transistor switch in response to the detected voltage exceeding the threshold voltage,
wherein the current limiting resistor is connected in parallel to the transistor switch, and
wherein the inrush current is configured to pass through the current limiting resistor during a start-up operation of the protection circuit and/or while the transistor switch is turned off.

2. The system of claim 1, wherein the transistor switch is provided in series with a DC link capacitor, and
wherein the transistor switch is positioned between the DC link capacitor and a DC negative line such that the protection circuit is configured to detect when the voltage across the transistor switch exceeds the threshold voltage in response to the detected inrush current from the DC link capacitor.

3. The system of claim 1, wherein the transistor switch is provided in series with an input rectifier, and
wherein the transistor switch is positioned between the input rectifier and a DC negative line such that the protection circuit is configured to detect when the voltage across the transistor switch exceeds the threshold voltage in response to the detected inrush current from the DC negative line.

4. The system of claim 1, wherein the inrush current detector comprises a gate driver circuit arranged to bias the transistor switch to be turned on in the normal operation of the protection circuit, with the transistor switch operating in a saturation region.

5. The system of claim 1, wherein the threshold voltage is a predetermined voltage which corresponds to desaturation of the transistor switch.

6. The system of claim 1, wherein the transistor switch comprises an insulated-gate bipolar transistor (IGBT) and the inrush current detector is arranged to detect an inrush current from the DC link according to a collector-emitter voltage of the transistor switch.

7. The system of claim 1, wherein the current limiting resistor is provided as a positive temperature coefficient thermistor.

8. The system of claim 1, wherein the protection circuit is provided in series with a DC link capacitor as part of a power conversion system, provided in series with an input rectifier of the power conversion system, or provided integral with a motor drive.

9. The system of claim 1, wherein the protection circuit is connected between a DC positive line and a DC negative line.

10. The system of claim 1, wherein the current limiting resistor is configured to reduce peak current flowing from a DC link capacitor during the start-up operation of the protection circuit, therein enabling charge to build up on the DC link capacitor.

11. The system of claim 1, wherein the protection circuit is configured to isolate the DC link when a fault condition is sensed.

12. A method of protecting components coupled to a direct current (DC) link, the method comprising:
- detecting an inrush current from the DC link in a protection circuit by a transistor switch of the protection circuit because a voltage across the transistor switch is a function of the inrush current flowing through the transistor switch from collector to emitter, wherein the transistor switch is turned on in normal operation of the protection circuit;
- turning off the transistor switch of the protection circuit in response to the detected inrush current when a voltage across the transistor switch exceeds a threshold voltage; and
- passing the inrush current through a current limiting resistor connected in parallel to the transistor switch during a start-up operation of the protection circuit and/or while the transistor switch is turned off.

13. The method of claim 12, wherein the transistor switch is provided in series with a DC link capacitor, and
wherein the transistor switch is positioned between the DC link capacitor and a DC negative line such that the protection circuit operates to detect when the voltage across the transistor switch exceeds the threshold voltage in response to the detected inrush current from the DC link capacitor.

14. The method of claim 12, wherein the transistor switch is provided in series with an input rectifier, and
wherein the transistor switch is positioned between the input rectifier and a DC negative line such that the protection circuit operates to detect when the voltage across the transistor switch exceeds the threshold voltage in response to the detected inrush current from the DC negative line.

15. The method of claim 12, further comprising:
detecting desaturation of the transistor switch, according to a collector-emitter voltage of the transistor switch rising above the threshold voltage.

16. The method of claim 12, further comprising:
powering down a supply from which the DC link is fed, or
outputting a fault notification signal.

* * * * *